MARCELLUS C. & BYRON D. GRAVES.

Thill Coupling.

No. 118,009.          Patented August 15, 1871.

*Scale: Double Model Size.*

*Section on line x-x*

*Section on line y-y.*

Witnesses:
Fred. Artos
R. D. Evans

Inventor:
Marcellus C. Graves
Byron D. Graves
by their Attys
A. H. & R. K. Evans

UNITED STATES PATENT OFFICE.

MARCELLUS C. GRAVES, OF TUSCOLA, MICHIGAN, AND BYRON D. GRAVES, OF WATERLOO, IOWA.

IMPROVEMENT IN THILL-COUPLINGS.

Specification forming part of Letters Patent No. 118,009, dated August 15, 1871.

*To all whom it may concern:*

Be it known that we, MARCELLUS C. GRAVES, of Tuscola, Tuscola county, Michigan, and BYRON D. GRAVES, of Waterloo, Black Hawk county, Iowa, have jointly invented an Improved Spring-Fastening for Thill-Couplings, of which the following is a clear, full, and exact description, reference being had to the accompanying drawing making a part of this specification.

To enable others skilled in the art to make and use our invention, we will proceed to describe the manner in which we have carried it out.

Figure 1:
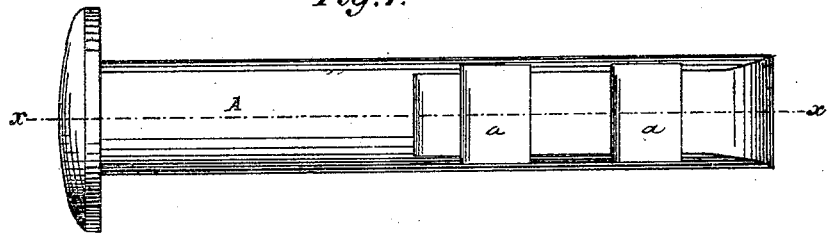
Figure 2:
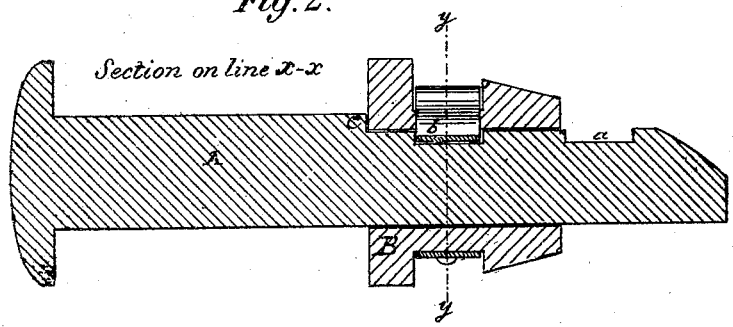
Figure 3:
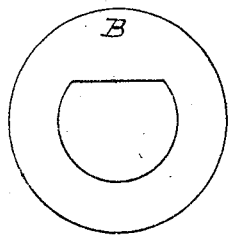
Figure 4:
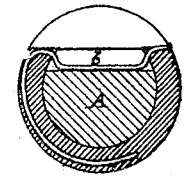

A is a headed bolt for fastening thills to a buggy or wagon, having a flattened surface near the end, as shown in Fig. 2, with the shoulder $c$. On the face of the flattened surface are formed the transverse grooves $a\ a$, into which fits the spring $b$. By a multiplication of these grooves the bolt is made to fit a thill of any ordinary thickness. Over the end of the bolt opposite to the head is passed the nut B, which is constructed so as to fit snugly upon the bolt and pass freely over the flattened and grooved portion of the bolt until it comes in contact with the shoulder $c$. Instead of the ordinary screw-thread for holding the nut in position on the bolt, we secure a spring, $b$, on the nut, (see Fig. 4,) which, working through a slot in the side of the nut, catches in the transverse groove in the bolt and holds the nut securely in position. The opening through the nut is made to conform in shape to the flattened side of the bolt, and hence can only be put on the bolt in a position for the spring to catch in the transverse grooves.

It is evident from this description of our invention that the nut of our improved bolt cannot be lost off or made to work loose by the jarring motion of a vehicle, as is the case when the nuts screw on the bolts as heretofore practiced. Our bolt will be found admirably adapted for all uses where bolts and nuts are needed.

Having thus described our invention, what we claim as new, and desire to secure by Letters Patent, is—

The bolt A having the transverse grooves $a\ a$, in combination with the nut B and spring $b$, substantially as and for the purpose described.

M. C. GRAVES.
BYRON D. GRAVES.

Witnesses as to M. C. GRAVES:
  DAVID GRAVES,
  W. H. EVANS.
Witnesses as to BYRON D. GRAVES:
  W. B. ADAMS,
  H. WM. VAN DER VAAST.